(12) United States Patent  (10) Patent No.: US 8,726,515 B2
Maruyama et al.  (45) Date of Patent: May 20, 2014

(54) OIL-IMPREGNATED SINTERED BEARING AND METHOD OF PRODUCING THE SAME (71) Applicants: Tsuneo Maruyama, Niigata (JP); Teruo Shimizu, Niigata (JP)

(72) Inventors: Tsuneo Maruyama, Niigata (JP); Teruo Shimizu, Niigata (JP)

(73) Assignee: Diamet Corporation, Niigata-shi (JP)

( * ) Notice: Subject to any disclaimer, the term of this patent is extended or adjusted under 35 U.S.C. 154(b) by 0 days.

(21) Appl. No.: 13/676,757

(22) Filed: Nov. 14, 2012

(65) Prior Publication Data

US 2013/0104400 A1    May 2, 2013

Related U.S. Application Data (62) Division of application No. 10/551,739, filed as application No. PCT/JP2004/004814 on Apr. 1, 2004, now Pat. No. 8,360,648.

(30) Foreign Application Priority Data

Apr. 2, 2003 (JP) ................. 2003-099059
Apr. 2, 2003 (JP) ................. 2003-099060
Apr. 2, 2003 (JP) ................. 2003-099061

(51) Int. Cl.
*B21K 1/10* (2006.01)
(52) U.S. Cl.
USPC ............... 29/898.042; 384/192; 384/276
(58) Field of Classification Search
USPC ............ 29/898.058, 898.059, 898.039; 384/192, 276, 279
See application file for complete search history.

(56) References Cited

U.S. PATENT DOCUMENTS

| | | | | |
|---|---|---|---|---|
| 3,445,148 A | * | 5/1969 | Grad et al. | 384/279 |
| 5,265,335 A | * | 11/1993 | Kawagoe et al. | 29/898.058 |
| 5,896,240 A | * | 4/1999 | Yamazaki et al. | 360/90 |
| 6,105,250 A | * | 8/2000 | Tanaka et al. | 29/898.02 |
| 2001/0055431 A1 | * | 12/2001 | Tasch et al. | 384/279 |
| 2002/0001420 A1 | * | 1/2002 | Tanaka et al. | 384/279 |
| 2002/0051590 A1 | * | 5/2002 | Sugimoto et al. | 384/279 |

FOREIGN PATENT DOCUMENTS

| | | |
|---|---|---|
| DE | 426999 C | 8/1926 |
| DE | 10025499 A1 | 11/2001 |
| GB | 2354291 A | 3/2001 |
| JP | 61-082020 A | 4/1986 |
| JP | 01-030922 A | 2/1989 |
| JP | 64-030922 A | 2/1989 |
| JP | 2-94451 U | 7/1990 |
| JP | 4-35651 U | 3/1992 |
| JP | 04-307112 A | 10/1992 |

(Continued)

OTHER PUBLICATIONS

European Search Report mailed Mar. 7, 2012 for the corresponding European Application No. EP 12 15 2069.

(Continued)

*Primary Examiner* — David Bryant
*Assistant Examiner* — Ruth G Hidalgo-Hernandez
(74) *Attorney, Agent, or Firm* — Leason Ellis LLP.

(57) ABSTRACT

An oil-impregnated sintered which does not damage rotating shaft and itself and has a high durability even in the case that the rotating shaft is inclined in the bearing by a large shear load applied thereto, and a method of manufacturing an oil-impregnated sintered bearing which exhibits center deviation-suppressing action of the bearing satisfactorily by accurately forming a bearing hole in an intermediate completely sintered are disclosed.

2 Claims, 8 Drawing Sheets

(56) References Cited

FOREIGN PATENT DOCUMENTS

| | | |
|---|---|---|
| JP | 05-071539 A | 3/1993 |
| JP | 11-037157 A | 2/1999 |
| JP | 11-230160 A | 8/1999 |

OTHER PUBLICATIONS

European Search Report mailed Mar. 10, 2011 for the corresponding European Patent Application No. 04725193.9.

International Search Report for PCT/JP2004/004814 mailed Jul. 20, 2004.

* cited by examiner

OIL-IMPREGNATED SINTERED BEARING AND METHOD OF PRODUCING THE SAME

CROSS-REFERENCE TO RELATED PATENT APPLICATIONS

This application is a Divisional of U.S. patent application Ser. No. 10/551,739, filed Feb. 16, 2006, which is a U.S. National Phase Application under 35 U.S.C. §371 of International Patent Application No. PCT/JP2004/004814, filed Apr. 1, 2004, which claims the benefit of Japanese Patent Application Nos. 2003-099059, filed Apr. 2, 2003, 2003-099060, filed Apr. 2, 2003, and 2003-099061, filed Apr. 2, 2003, all of which are incorporated by reference herein. The International Application was published in Japanese on Oct. 21, 2004 as International Publication No. WO/WO/2004/090360 under PCT Article 21(2).

FIELD OF THE INVENTION

The present invention relates to an oil-impregnated sintered bearing and a method of manufacturing the same.

BACKGROUND OF THE INVENTION

An oil-impregnated sintered bearing includes a sintered body in which lubricating oil is impregnated in advance, and thermally expands due to pumping action and frictional heat caused by rotation of a shaft so that lubricating oil comes out of the sintered body to lubricate a friction surface. Since the oil-impregnated sintered bearing can be used for a long time without supply of oil, the oil-impregnated sintered bearing has been widely used as a bearing for supporting a rotating shaft of a vehicle or home electric appliances, an acoustic equipment, etc.

In the conventional oil-impregnated sintered bearing, in order to center the rotating shaft inserted into a bearing hole, a portion of the bearing hole is formed to have a diameter smaller than diameters of other portions in the bearing hole, and the only portion having the smaller diameter comes into contact with the rotating shaft.

In the meantime, as described above, in a case where a portion of the bearing hole is formed to have a diameter smaller than diameters of other portions in the bearing hole, since the length of a portion actually contacting the rotating shaft is shorter than the entire length of the bearing, there has been problems in that the supporting state of the rotating shaft is likely to be unstable and the rotating shaft is likely to be deviated.

Consequently, in the conventional oil-impregnated sintered bearing, the bearing hole is formed to have a journal part that supports the rotating shaft and enlarged diameter parts that are connected with the journal part and have constant diameters to be enlarged toward the tips thereof. Furthermore, the enlarged diameter parts are formed to have sintering density higher than that of the journal part in order to suppress deviation from the center of the rotating shaft (for example, see Japanese Laid-Open Patent Application Publication No. 64-030922).

In the bearing having the above-mentioned structure, when a shear load is applied to the rotating shaft, the lubricating oil lubricating between the rotating shaft and the journal part is pushed toward the enlarged diameter parts due to the occurrence of runout of the rotating shaft then filled between the rotating shaft and the enlarged diameter parts. The lubricating oil filled between the rotating shaft and the enlarged diameter parts is pressed by the runout of the rotating shaft so as to be impregnated into the enlarged diameter parts. However, since the enlarged diameter parts are thickly formed, the lubricating oil is not impregnated and remains between the rotating shaft and the enlarged diameter parts to apply reaction forces to the rotating shaft. The runout of the rotating shaft is suppressed by the reaction forces so as to prevent the deviation from the center of the rotating shaft with respect to the bearing.

The bearing having the above-mentioned structure is very effective in suppressing deviation from the center of the rotating shaft. Accordingly, in a case where the conventional oil-impregnated sintered bearing is used to support the rotating shaft, for example, if torque is transmitted to rotate the rotating shaft in a certain direction, a shear load is applied to the rotating shaft. However, when the shear load is very large and the rigidity of the rotating shaft is not sufficiently high, the rotating shaft is deflected due to the shear load and the rotating shaft is rotated while an axis thereof is inclined in a bearing body. Therefore, there is a possibility of becoming the state (motion that the rotating shaft scrapes out the inner surface of the bearing) where the surface of the rotating shaft does not correctly come into contact with the friction surface of the bearing. In such a state, since the rotating shaft receives strong resistance, it is difficult to rotate the rotating shaft, thereby not sufficiently functioning as a bearing. Moreover, if the state is repeated, it is also considered that durability of the rotating shaft and the bearing deteriorates.

In addition, when a shear load causing runout of the rotating shaft is remarkably large and a push-back action caused by the lubricating oil remaining between the rotating shaft and the enlarged diameter parts does not sufficiently function, the rotating shaft is supported while the axis of the rotating shaft is inclined in the bearing body. In this case, since the surface of the rotating shaft is pushed against boundaries between the journal part and the enlarged diameter parts thereby coming in contact with the bearing body at a point. In this case, if the rotating shaft acts as described above, both end of the journal part are scraped out and stress concentration occurs at the contact portion between the rotating shaft and the bearing body. In this way, if the stress concentration occurs, excessive abrasion and overheating occurs from the contact portion. This phenomenon does not occur as long as a push-back action caused by the lubricating oil remaining between the rotating shaft and the enlarged diameter parts function. However, when a large unexpected shear load is suddenly applied, there is a possibility that durability of the rotating shaft and the bearing deteriorates.

In the bearing, since taper angles (Angles formed by an inclined plane of the enlarged diameter parts with respect to a longitudinal direction of the bearing along an axis of the journal part, that is, a longitudinal direction of the rotating shaft supported by the bearing, and angles formed between an inner surface of the journal part and inclined planes of the enlarged diameter parts are the same) are set to very small angles of 2° to 3°, a very high machining accuracy is required. If the taper angles are not set accurately, there is a possibility of not sufficiently exhibiting center deviation-suppressing action for the rotating shaft.

SUMMARY OF THE INVENTION

The invention has been made to solve the above-mentioned problems, and it is an object of the invention to provide an oil-impregnated sintered bearing which functions as a bearing and has a high durability even in the case that the rotating shaft is deflected due to a shear load applied to the rotating shaft.

Furthermore, it is another object of the invention to provide an oil-impregnated sintered which does not damage rotating shaft and itself and has a high durability even in the case that the rotating shaft is inclined in the bearing by a large shear load applied thereto.

In addition, it is a still another object of the invention to provide a method of manufacturing an oil-impregnated sintered bearing which exhibits center deviation-suppressing action of the bearing satisfactorily by accurately forming a bearing hole in an intermediate completely sintered.

An oil-impregnated sintered bearing having the following structure is employed to solve the problems. That is, according to a first aspect of the invention, an oil-impregnated sintered bearing includes a bearing hole formed in the bearing body made of a sintered metal to support a rotating shaft by an inner surface thereof as a friction surface. In this case, the bearing hole includes a journal part that has a constant diameter, and enlarged diameter parts that are provided on both sides of the journal part in the longitudinal direction thereof, respectively, so as to be connected with the journal part.

According to a second aspect of the invention, in the above-mentioned structure, it is preferable that the enlarged diameter parts be provided on both sides of the journal part in the longitudinal direction thereof, respectively; a taper angle with respect to the longitudinal direction of one enlarged diameter part which is provided on one side of the journal part and a taper angle with respect to the longitudinal direction of the other enlarged diameter part which is provided on the other side of the journal part be equal to each other; and a line obliquely extending along an inclined surface of one enlarged diameter part is arranged parallel to a line obliquely extending along an inclined surface of the other enlarged diameter part and a distance between the lines is substantially equal to the diameter of the rotating shaft.

According to a third aspect of the invention, in the above-mentioned structure, it is preferable that a distance between the line obliquely extending along an inclined surface of the enlarged diameter part and the journal part facing the inclined surface of the enlarged diameter part across the middle of the bearing body be substantially equal to the diameter of the rotating shaft.

According to a fourth aspect of the invention, in the above-mentioned structure, it is preferable that the taper angles with respect to the longitudinal direction of the enlarged diameter part be 3° or less.

According to a fifth aspect of the invention, in the above-mentioned structure, it is preferable that the enlarged diameter parts be formed stepwise so that the taper angles with respect to the longitudinal direction of the enlarged diameter parts are different from each other, and it is preferable that the taper angle of one enlarged diameter part positioned away from the journal part be larger than the taper angle of the other enlarged diameter part.

According to a sixth aspect of the invention, in the above-mentioned structure, it is preferable that the enlarged diameter parts be formed so that the difference between the taper angles of adjacent enlarged diameter parts is 3° or less.

According to a seventh aspect of the invention, a method of manufacturing an oil-impregnated sintered bearing which has a bearing hole formed in the bearing body made of a sintered metal to support a rotating shaft, the bearing hole including a journal part of which an inner surface as a friction surface has a constant diameter and enlarged diameter parts that are provided so as to be connected with the journal part and are formed in a tapered shape having diameters to be enlarged toward the tips thereof, includes a process of forming a bearing hole that includes the journal part having a constant diameter by pressing an inner circumferential surface of a cylindrical sintered body completely sintered, and a process of forming the enlarged diameter parts so as to be connected with the journal part by re-pressing the inner circumferential surface of the cylindrical sintered body.

According to an eighth aspect of the invention, in the above-mentioned method, it is preferable that substantially cone-shaped press dies each having a base having a diameter larger than the inner diameter of the sintered body be used for forming the enlarged diameter parts.

According to a ninth aspect of the invention, in the above-mentioned method, it is preferable that the press dies be simultaneously inserted from both sides of the sintered body, respectively, and the tips of the press dies be pushed against the inner circumferential surface of the sintered body so as not to come into contact with each other.

According to a tenth aspect of the invention, an oil-impregnated sintered bearing has a bearing hole formed in the bearing body made of a sintered metal to support a rotating shaft, and the bearing hole includes a journal part of which an inner surface as a friction surface has a constant diameter and enlarged diameter parts that are provided so as to be connected with the journal part and are formed in a tapered shape having diameters to be enlarged toward the tips thereof. In this case, the bearing hole that includes the journal part having a constant diameter by pressing an inner circumferential surface of a cylindrical sintered body completely sintered is formed, and then the enlarged diameter parts so as to be connected with the journal part by re-pressing the inner circumferential surface of the cylindrical sintered body is formed.

In the invention, if torque is transmitted to rotate the rotating shaft in a certain direction, a shear load is applied to the rotating shaft and the rotating shaft is deflected due to the shear load. When the rotating shaft is deflected so as to be inclined in the bearing, the surface of the rotating shaft does not come into contact with the journal part but comes into contact with the enlarged diameter parts so that the rotating shaft is rotated while contacting the enlarged diameter parts as friction surfaces. The enlarged diameter parts thermally expands due to the pumping action and frictional heat caused by rotation of the shaft to lubricate a friction surface, and exhibits function as a bearing. That is, even though the rotating shaft is rotated while the rotating shaft is deflected and the axis thereof is inclined in the bearing body 1, the surface of the rotating shaft comes into contact with the enlarged diameter parts to obtain the same action as that of the conventional oil-impregnated bearing.

In addition, when the magnitude of torque transmitted to the rotating shaft is different, the amount of deflection varies in proportion to the magnitude of torque and the oblique angle of the rotating shaft is also varied in the bearing. In the invention, when a relatively small torque is transmitted to rotate the rotating shaft, the surface of the rotating shaft comes into contact with the enlarged diameter parts having small taper angles and function as a bearing is exhibited as described above. Furthermore, when a large torque is exerted to rotate the rotating shaft, the surface of the rotating shaft comes into contact with the enlarged diameter parts having large taper angles and exhibits functions as a bearing. The enlarged diameter parts may be formed so as to correspond to the magnitude of torque.

Moreover, when a shear load causing runout of the rotating shaft is remarkably large and a push-back action caused by the lubricating oil remaining between the rotating shaft and the enlarged diameter parts does not sufficiently function, the rotating shaft is supported while the axis of the rotating shaft is inclined in the bearing body. In this case, in the invention, since the surface of the rotating shaft does not scrape out both ends of the journal part and is pushed against the enlarged diameter parts by a line, stress concentration does not occur at the contact portion. Accordingly, excessive abrasion and overheating does not occur.

In the invention, the bearing hole including a journal part having a constant diameter is formed by pressing an inner circumferential surface of a cylindrical sintered body completely sintered, and then the enlarged diameter parts are formed so as to be connected with the journal part by re-pressing the inner circumferential surface of the cylindrical sintered body. Therefore, it is possible to accurately form angles between an inner surface of the journal part and the inclined planes of the enlarged diameter parts.

Both a process of manufacturing the bearing hole that includes a journal part having a constant diameter by pressing an inner circumferential surface of a cylindrical sintered body completely sintered, and a process of manufacturing the enlarged diameter parts so as to be connected with the journal part by re-pressing the inner circumferential surface of the cylindrical sintered body are referred to as sizing process for improving dimensional accuracy. However, in the sizing process, the bearing hole that includes a journal part and has a constant diameter is formed first, and then the enlarged diameter parts are formed on the basis of the bearing hole. Therefore, positions of the enlarged diameter parts are accurately adjusted with respect to the journal part whereby angles between the inner surface of the journal part and the inclined planes of the enlarged diameter parts are also formed accurately.

In the invention, since truncated-cone shaped press dies each having a base having a diameter larger than the inner diameter of the sintered body are used for forming the enlarged diameter parts, it is possible to form the enlarged diameter parts with a high accuracy. The enlarged diameter parts are formed to be copied from the conical surfaces of the press dies. However, since portions of walls of the bearing body, which are flared outward by pressing the bearing hole having an original constant diameter, are slightly pushed toward the journal part, the inner surface of the journal part rises. Accordingly, the inner diameter of the journal part decreases. In this case, since the press dies are formed in a conical shape, the rising inner surface of the journal part becomes the enlarged diameter parts and boundaries between the journal part and the enlarged diameter parts are very accurately formed without superficial roughness.

In the invention, the press dies are simultaneously inserted from both sides of the sintered body, respectively, and the tips of the press dies are pushed against the inner circumferential surface of the sintered body so as not to come into contact with each other. For this reason, the inner surface of the journal part rises uniformly, and the diameter of the journal part is constant at any position thereof.

DETAILED DESCRIPTION OF THE INVENTION

Best Mode for Carrying out the Invention

A first embodiment of an oil-impregnated sintered bearing according to the invention will be described with reference to FIGS. 1 to 4.

Figure 1:
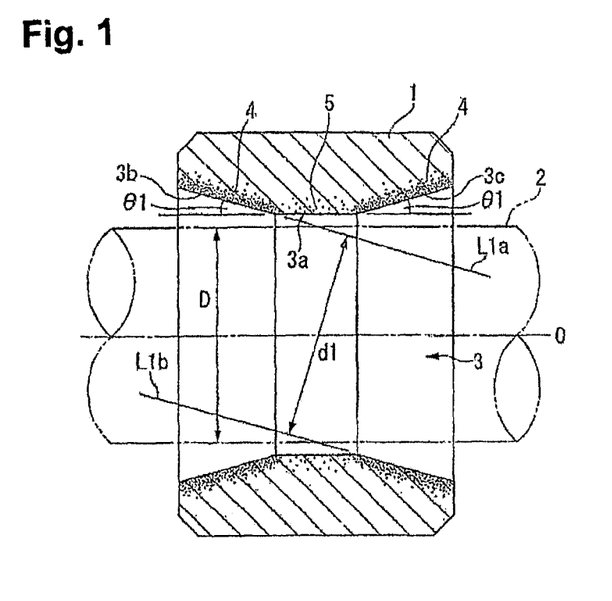
FIG. 1 is a cross-sectional view taken along an axis of a rotating shaft showing an oil-impregnated sintered bearing according to a first embodiment of the invention.

An oil-impregnated sintered bearing (hereinafter, simply referred to as a bearing) shown in FIG. 1 includes a bearing hole 3 formed in the bearing body 1 made of a sintered metal to insert a rotating shaft 2 therethrough. The bearing hole 3 has a circular cross section in a plane orthogonal to a longitudinal axis O of the rotating shaft 2, and is provided with a journal part 3a and enlarged diameter parts 3b and 3c. The journal part 3a is provided roughly at the center of the bearing body 1 and has a diameter slightly larger than the diameter of the rotating shaft 2. In this case, the journal part 3a has a constant diameter at any position in the longitudinal direction thereof Furthermore, the enlarged diameter parts 3b and 3c are provided on both sides of the journal part 3a in the longitudinal direction thereof so that the enlarged diameter parts 3b and 3c are connected with both ends of the journal part 3a, respectively. In this case, the enlarged diameter parts 3b and 3e are formed in a tapered shape having a constant diameter to be enlarged toward the tips thereof Angles (taper angles) $\theta_1$ formed between inclined planes of the enlarged diameter parts 3b and 3c and an inner surface (or axis O of the rotating shaft 2) of the journal part 3a parallel to the axial direction of the bearing body 1 are set to 3° or less. In addition, in FIG. 1, the $\theta_1$ is exaggeratedly shown so as to be shown clearly.

When the bearing body 1 is seen from a cross section taken along the axis O of the rotating shaft 2 (see FIG. 1), two enlarged diameter parts 3b and 3c having a journal part 3a therebetween are formed so as to satisfy the following: a line L1a which obliquely extends along an inclined surface of one enlarged diameter parts 3b toward the center of the bearing body 1 is arranged parallel to a line L1b which obliquely extends along an inclined surface of the other enlarged diameter parts 3c positioned at an opposing corner with respect to the one enlarged diameter parts 3b toward the center of the bearing body 1, and a distance d1 between the line L1a and the line L1b is slightly larger than a diameter D of the rotating shaft 2 and is substantially equal to the inner diameter of the journal part 3a.

Inner wall parts 4 of the bearing body 1 forming the enlarged diameter parts 3b and 3c have a higher sintering density than an inner wall part 5 thereof forming the journal part 3a, that is, gas cavities remaining on the surfaces and inside of the inner wall parts 4 are smaller in size and fewer in number those of the inner wall part 5. The difference in density occurs in the respective parts of the bearing body 1 by adjusting pressure applied to the respective parts thereof in a correction process performed after a sintering process.

Figure 3:
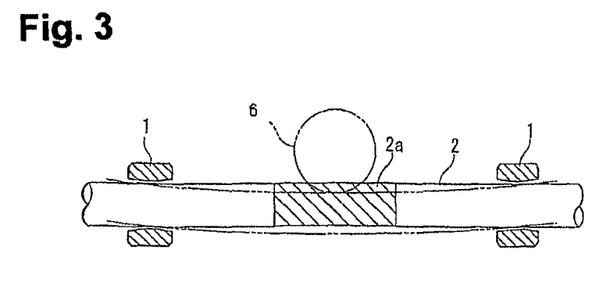
FIG. 3 is a view showing the entire outline of a mechanism in which a rotating shaft is supported at two points by the oil-impregnated sintered bearings of FIG. 1.

The bearing having the above-mentioned structure is used in the state in which the bearing body 1 is impregnated with lubricating oil and the rotating shaft 2 is inserted into the bearing hole 3. FIG. 3 shows an example of a mechanism in which a rotating shaft 2 is supported at two points by the bearings. In the mechanism, a spiral gear 2a is formed on the circumferential surface of the rotating shaft 2, and both ends of the rotating shaft 2 are supported by the bearings. The mechanism is constructed so that a spiral gear 6 rotated by a driving device (not shown) is engaged with the spiral gear 2a of the rotating shaft 2 to rotate the rotating shaft 2. Although the rotating shaft 2 is actually not deflected as much as shown in FIG. 3, the rotating shaft 2 is exaggeratedly shown to clarify the point of the description.

When a relatively small torque is transmitted to rotate the rotating shaft 2, a shear load transmitted to the rotating shaft 2 is also small and runout or deflection does not occur on the rotating shaft 2. Therefore, the surface of the rotating shaft 2 comes into contact with the journal part 3a, and the rotating shaft 2 is supported by the journal part 3a serving as a friction surface. Since the journal part 3a thermally expands due to pumping action and frictional heat caused by rotation of the rotating shaft 2, lubricating oil comes out of the inside of the bearing body 1 to lubricate the friction surface.

Figure 4:
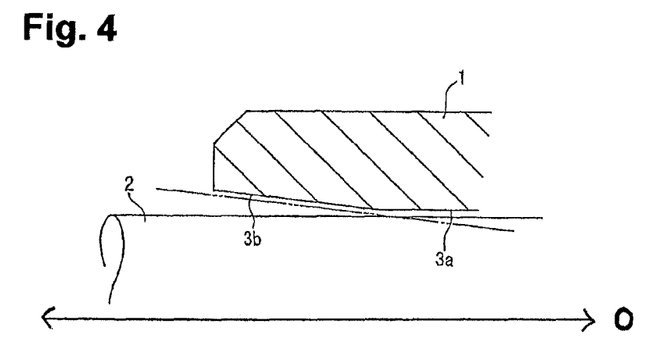
FIG. 4 is an enlarged view of principal parts showing a state in which the oil-impregnated sintered bearing comes into contact with the rotating shaft.

When a remarkably large torque is exerted to rotate the rotating shaft 2, a shear load exerted on the rotating shaft 2 becomes large and the rotating shaft 2 is deflected (two-dot chain line in FIG. 3). As shown in FIG. 4, the rotating shaft 2 is inclined in the bearing so that the axis o is inclined. However, the surface of the rotating shaft 2 does not come into contact with not the journal part 3a but comes into contact with the enlarged diameter parts 3b and 3c to be supported by the enlarged diameter parts 3b and 3c serving as friction surfaces. Since the enlarged diameter parts 3b and 3c thermally expand like the journal part 3a due to the pumping action and frictional heat caused by rotation of the rotating shaft 2, lubricating oil comes out of the inside of the bearing body 1 to lubricate the friction surfaces.

In addition, when a large torque is exerted to rotate the rotating shaft 2, a shear load exerted on the rotating shaft 2 is large. Accordingly, strong runout occurs in the rotating shaft 2 to generate deviation from the center thereof. In this case, since the runout occurs in the rotating shaft 2, the lubricating oil lubricating between the rotating shaft 2 and the journal part 3a is extruded to the one enlarged diameter part 3b and the other the enlarged diameter part 3c. Therefore, the lubricating oil is filled between the rotating shaft 2 and the enlarged diameter part 3b, or between the rotating shaft 2 and the enlarged diameter part 3c. The lubricating oil filled between the rotating shaft 2 and the enlarged diameter parts 3b and 3c is pressurized by the runout of the rotating shaft 2 so as to be pushed against enlarged diameter parts 3b and 3c. However, since the enlarged diameter parts 3b and 3c are thickly formed, the lubricating oil is not impregnated into the enlarger diameter parts and remains between the rotating shaft 2 and the enlarged diameter parts 3b and 3c to apply reaction forces to the rotating shaft 2. The runout of the rotating shaft 2 is suppressed by the reaction forces so as to prevent the deviation from the center of the rotating shaft 2 with respect to the bearing.

Figure 2:
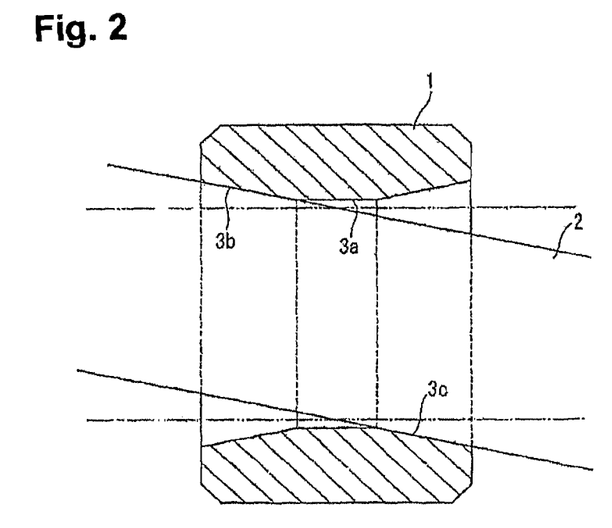
FIG. 2 is a view showing the entire outline of the rotating shaft inclined in the bearing.

However, when a shear load applied to the rotating shaft 2 is remarkably large and a push-back action caused by the lubricating oil remaining between the rotating shaft 2 and the enlarged diameter parts 3b and 3c does not sufficiently function, the rotating shaft 2 is supported while the axis of the rotating shaft 2 is inclined in the bearing body 1. In this case, as shown in FIG. 2, since the surface of the rotating shaft 2 comes into contact with the enlarged diameter parts 3b and 3c not by a point but by a line, respectively, stress concentration does not occur between the rotating shaft 2 and the bearing body 1. Therefore, excessive abrasion and overheating does not occur between the rotating shaft 2 and the bearing body 1.

In the bearing, although the rotating shaft 2 is deflected due to the shear load and thus rotated while the axis O is inclined in the bearing, the surface of the rotating shaft 2 comes into contact with the enlarged diameter part 3b during the rotation of the rotating shaft 2, whereby a function of a conventional oil-impregnated bearing is obtained. Accordingly, the function serving as a bearing does not deteriorate and deterioration of durability does not occur.

Processes of manufacturing the above-mentioned bearing will be described with reference to FIGS. 5 to 7.

Respective processes which include mixing raw powder, forming and sintering are performed. Thereafter, sizing is performed. The sizing includes two processes that have a process of forming the bearing hole 3 having the journal part 3a and a process of forming the enlarged diameter parts 3b and 3c on both sides of the journal part 3a.

Figure 5A:
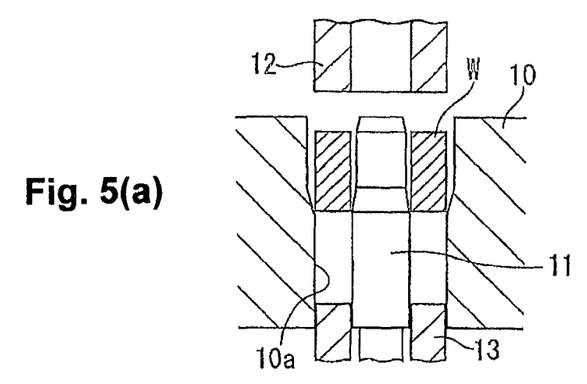
FIGS. 5A-5C are views sequentially illustrating a sizing process of the manufacturing processes of the oil-impregnated sintered bearing of FIG. 1.
Figure 5B:
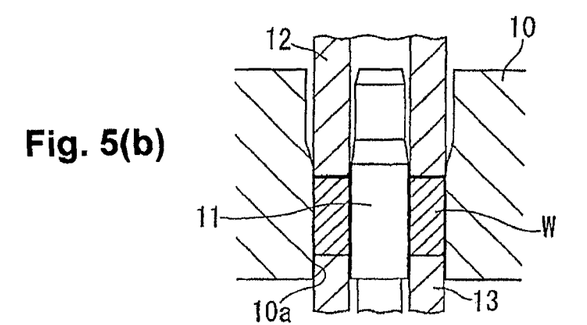
Figure 5C:
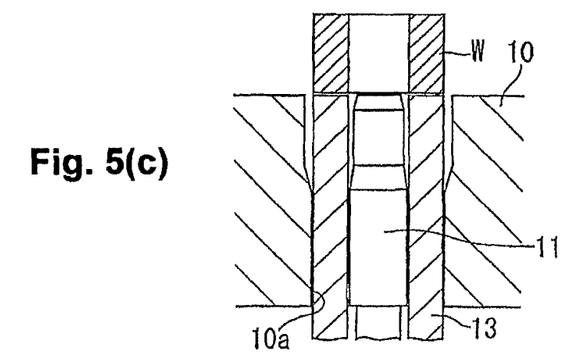

As shown in FIGS. 5A to 5C, a die 10 that has a cylindrical hole 10a, a first core rod 11 that has a round bar shape and can be inserted into the hole 10a from below with clearances, a first upper punch 12 that can be fitted into the hole 10a from above and has a simple annular tip surface, and a first lower punch 13 that can be fitted into the hole 10a from below and has a simple annular tip surface are used in the process of forming the bearing hole 3 having the journal part 3a.

The first core rod 11 has two different diameters at the tip and base thereof, and the outer diameter of the base thereof, which has a larger diameter than the tip thereof, is substantially equal to the inner diameter of a sintered body W. The first core rod 11 can be inserted into and be extracted from the first lower punch 13. The die 10 is fixed in place, and the core rod 11, the first upper punch 12, and the first lower punch 13 are driven by driving devices (not shown).

Furthermore, as shown FIG. 5A, the first lower punch 13 is fitted into the hole 10a of the die 10, and the core rod 11 is inserted into the hole 10a through the first lower punch 13. Then, the sintered body W is put into the hole 10a from above the die 10. The sintered body W is disposed in the hole 10a so that the tapered tip of the core rod 11 is inserted into the sintered body W.

Next, as shown in FIG. 5B, the first upper punch 12 is fitted into the hole 10a to strongly push down the sintered body W. The pushed-down sintered body W is interposed between the first upper punch 12 and the first lower punch 13 so as to be pressed from above and below by the first upper punch 12 and the first lower punch 13 to be slightly pushed and contracted. In addition, the outer surface of the sintered body W is pushed against the inner surface of the hole 10a to be corrected in a smooth cylindrical shape, and the outer surface of core rod 11 is pushed against the sintered body W to correct the inner surface of the sintered body W in a smooth cylindrical shape (a bearing hole 3, which includes a journal part 3a and has a constant diameter, is formed in the sintered body W).

When the correction is completed, the first upper punch 12 is extracted from the hole 10a. Subsequently, as shown in FIG. 5C, the first lower punch 13 is pushed up and then the corrected sintered body W is ejected from the hole 10a.

Figure 6A:
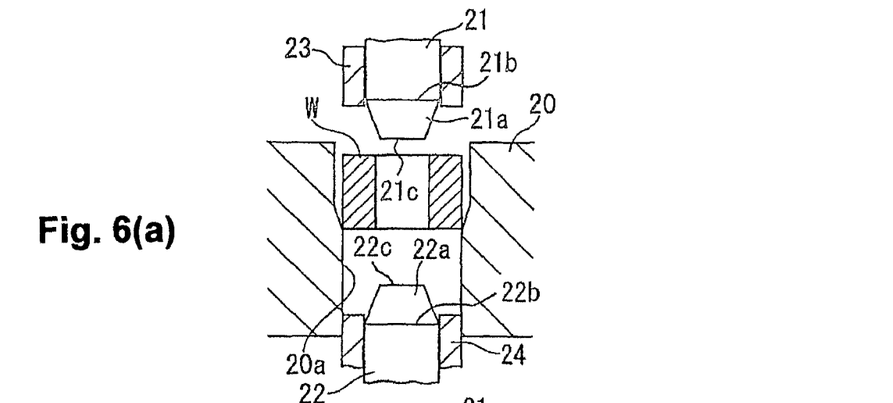
FIGS. 6A-6C are views sequentially illustrating a sizing process of the manufacturing processes of the oil-impregnated sintered bearing of FIG. 1.
Figure 6B:
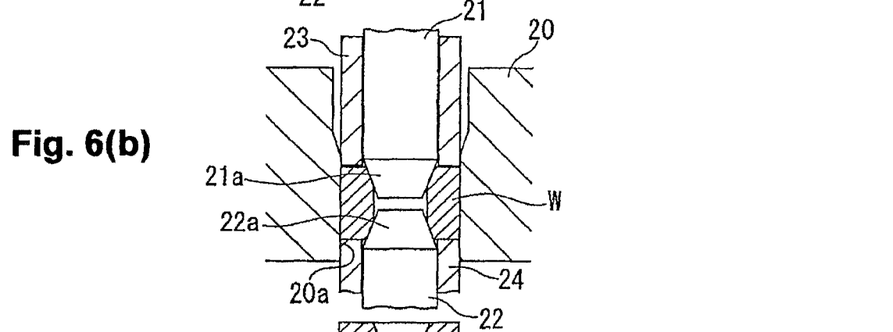
Figure 6C:
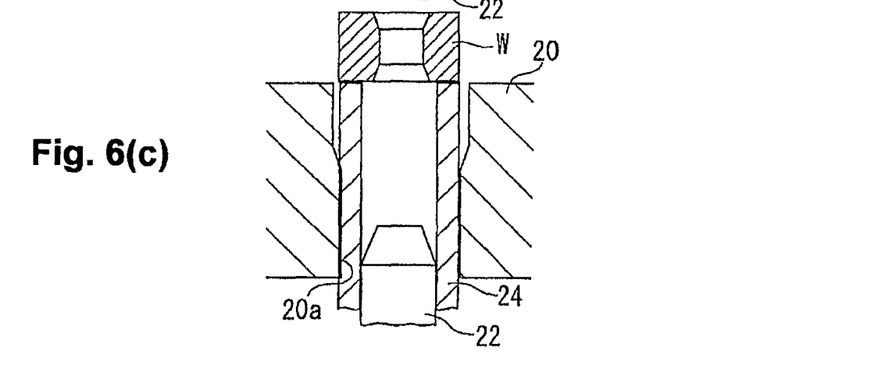

As shown in FIGS. 6A to 6C, a die 20 having a hole 20a whose diameter is substantially equal to the outer diameter of the sintered body W, a second core rod 21 that has a round bar shape and can be inserted into the hole 20a from above with clearances, a third core rod 22 that has a round bar shape and can be inserted into the hole 20a from below with clearances, a second upper punch 23 that can be fitted into the hole 20a from above and has a simple annular tip surface, and a second lower punch 24 that can be fitted into the hole 20a from below and has a simple annular tip surface are used in the process of forming the enlarged diameter parts 3b and 3c on both sides of the journal part 3a.

The outer diameters of the second and third core rods 21 and 22 are larger than the inner diameter of the sintered body W, and the tips 21a and 22a of the second and third core rods 21 and 22 are truncated-cone shaped press dies. Both tips 21a and 22a thereof have the same dimension, and diameters of the bases 21b and 22b thereof are larger than the inner diameter of the sintered body W. The outer diameter of the tip surfaces 21a and 22a are smaller than the inner diameter of the sintered body W. The second core rod 21 can be inserted into or extracted from the second upper punch 23, and the third core rod 22 can be inserted into or extracted from the second lower punch 24.

The die 20 is fixed in place, and the second and third core rods 21 and 22, the second upper punch 23, and the second lower punch 24 are driven by driving devices (not shown).

First, as shown FIG. 6A, the second lower punch 24 is fitted into the hole 20a of the die 20, and the third core rod 22 is inserted into the hole 20a through the second lower punch 24. Moreover, the second upper punch 23 having the second core rod 21 inserted therein is put in a standby state above the die 20. Then, the sintered body W in which a bearing hole 3 having a journal part 3a is completely formed is put into the hole 20a from above the die 20.

Next, as shown FIG. 6B, the second upper punch 23 is fitted into the hole 20a in synchronization with the second core rod 21 to push down the sintered body W. The pushed-down sintered body W is interposed between the second core rod 21 and the third core rod 22 so as to be pressed by the second core rod 21 and the third core rod 22. In this case, driving distances and shapes of the tips of the core rods 21 and 22 are determined so that tip surfaces 21c and 22c of the core rods does not come into contact with each other.

The tips 21a and 22a of the core rods come into contact with openings, respectively, which are provided on both ends of the bearing hole 3 formed by the previously performed sizing process, and then are inserted into the bearing hole 3 so as to be guided in the longitudinal direction of the bearing hole 3. The sintered body W is corrected by pushing intruding conical surfaces of the tips 21a and 22a of the core rods against the bearing hole 3 (the enlarged diameter parts 3b and 3c are formed on both sides of the journal part 3a). In this case, since portions corresponding to the enlarged diameter parts 3b and 3c are re-pressed by the conical surfaces of the tips 21a and 22a, sintering density of the portions corresponding to the enlarged diameter parts 3b and 3c becomes high and the difference in density occurs between the journal part 3a and the above-mentioned portions.

When the correction is completed, the second core rod 21 and the second upper punch 23 are extracted from the hole 20a, subsequently, as shown in FIG. 6C, the second lower punch 24 is pushed up and then the corrected sintered body W is ejected from the hole 20a.

As mentioned above, in the sizing process, the bearing hole 3 that includes a journal part 3a and has a constant diameter is formed first, and then the enlarged diameter parts 3b and 3c are formed on the basis of the bearing hole 3. Therefore, positions of the enlarged diameter parts 3b and 3c are accurately adjusted with respect to the journal part 3a and angles (taper angles) $\theta_1$ between the inner surface of the journal part 3a and the inclined planes of the enlarged diameter parts 3b and 3c are formed very accurately.

Figure 7:
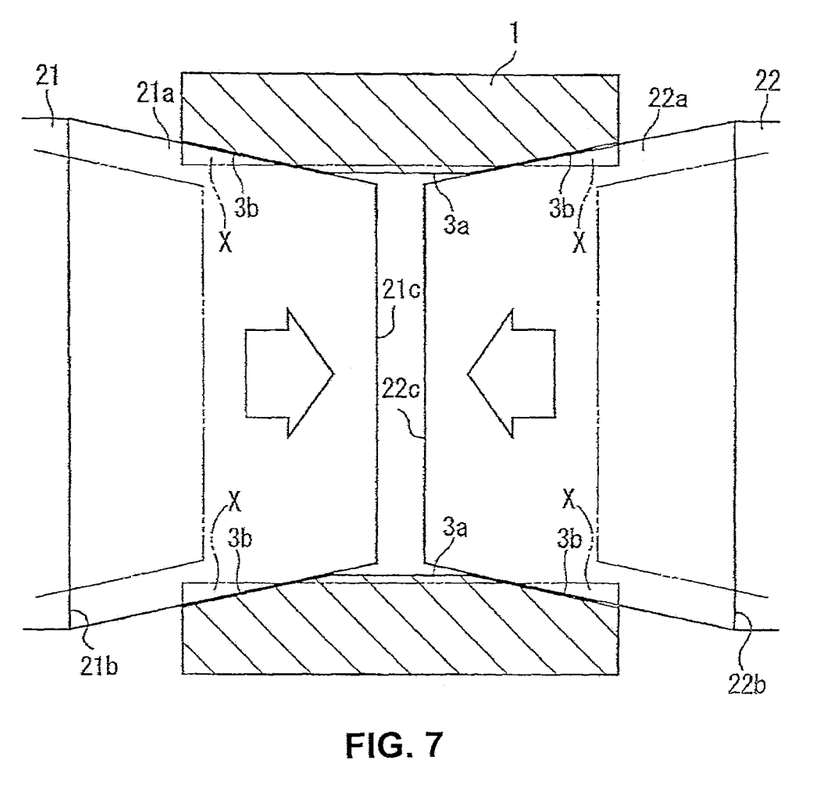
FIG. 7 is a view illustrating a shape of the bearing to be varied by the sizing.

In addition, if the second and third core rods 21 and 22 which are press dies each having truncated-cone shaped tips are used in forming the enlarged diameter parts 3b and 3c, as shown in FIG. 7, the enlarged diameter parts 3b and 3c are formed so as to be copied from the conical surfaces of the tips 21a and 22a of the core rods. However, since portions (X portions in FIG. 7) of walls of the bearing body 1, which are flared outward by pressing the bearing hole 3 having an original constant diameter using the conical surfaces of the tips 21a and 22a, are pushed toward the journal part 3a, the inner surface of the journal part 3a rises. Accordingly, the inner diameter of the journal part 3a decreases. In this case, since the tips 21a and 22a of the core rods are formed in a conical shape, the rising inner surface of the journal part 3a becomes the enlarged diameter parts 3b and 3c, which are pushed against the conical surfaces of the tips 21a and 22a. Furthermore, boundaries between the journal part 3a and the substantially enlarged diameter parts 3b and 3c are very accurately formed without irregularities. Moreover, the hardness of a portion becoming the journal part 3a increases by pressing the portion becoming the journal part 3a in advance. Accordingly, even though the core rods are inserted into both ends of the bearing body 1, deformation caused by swelling does not occur on the inner surface of the journal part 3a and a smooth cylindrical shape is maintained.

In addition, the second and third core rods 21 and 22 are inserted from both sides of the sintered body W at the same time, respectively, and the tips 21a and 22a of the core rods are pushed against the inner circumferential surface of the sintered body W so as not to come into contact with each other. Thereby, the inner surface of the journal part 3a rises uniformly as shown in FIG. 7, and the diameter of the journal part 3a is constant at any position thereof. Next, a second embodiment of the oil-impregnated sintered bearing according to the invention will be described with reference to FIGS. 8 to 10.

Figure 8:
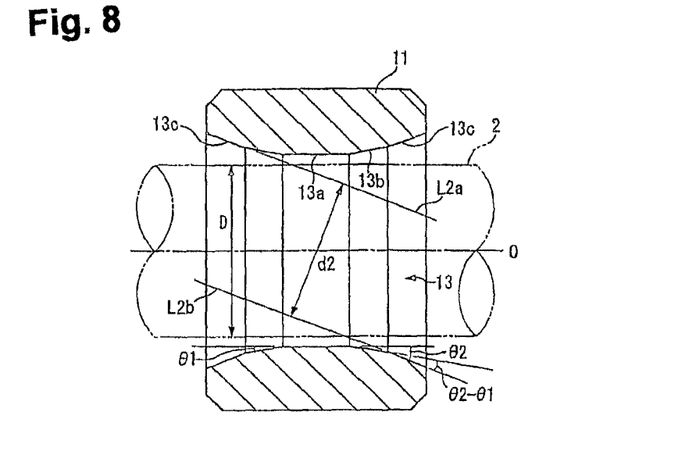
FIG. 8 is a cross-sectional view showing an oil-impregnated sintered bearing according to a second embodiment of the invention.

A bearing shown in FIG. 8 includes a bearing body 11 that is made of a sintered metal and has a bearing hole 13 formed therein. The bearing hole 13 has a circular cross section in a plane orthogonal to the longitudinal axis O of the rotating shaft 2, and is provided with a journal part 13a, first enlarged diameter parts 13b and second enlarged diameter parts 13c. The journal part 13a is provided roughly at the center of the bearing body 1 and has a diameter slightly larger than the diameter of the rotating shaft 2. In this case, the journal part 13a has a constant diameter at any position in the longitudinal direction thereof. Furthermore, the first enlarged diameter parts 13b are provided on longitudinal opposite sides of the journal part 13a so that the first enlarged diameter parts 13b are connected with both ends of the journal part 13a, respectively. In this case, the first enlarged diameter parts 13b are formed in a tapered shape having constant diameters to be enlarged toward the tips of the first enlarged diameter parts 13b. Moreover, the second enlarged diameter parts 13c are provided on longitudinal opposite sides (further outside of the first enlarged diameter parts 13b) of the first enlarged diameter parts 13b so that the second enlarged diameter parts 13c are connected with both ends of the first enlarged diameter parts 13b, respectively. In this case, the second enlarged diameter parts 13c are formed in a tapered shape having constant diameters to be enlarged toward the tips of the second enlarged diameter parts 13c.

The first enlarged diameter parts 13b and the second enlarged diameter parts 13c are formed stepwise so that taper angles between the first enlarged diameter parts 13b and the inner surface (or an axis of the rotating shaft 2) of the journal part 13a parallel to the axial direction of the bearing body 1 are different from taper angles between the second enlarged diameter parts 13c and the inner surface thereof. In this case, the taper angles $\theta_2$ of the second enlarged diameter parts 13c positioned away from the journal part 13a are larger than the taper angles $\theta_1$ of the first enlarged diameter parts 13b. The taper angles $\theta_1$ of the first enlarged diameter parts 13b are set to 3° or less, and the taper angles $\theta_2$ of the second enlarged diameter parts 13c are set so that differences between the taper angles $\theta_2$ of the second enlarged diameter parts 13c and the taper angles $\theta_1$ of the first enlarged diameter parts 13b adjacent to the second enlarged diameter parts 13c are 3° or less.

When the bearing body 11 is seen from a cross section taken along the axis O of the rotating shaft 2 (see FIG. 8), two second enlarged diameter parts 13c positioned further outside of the first enlarged diameter parts 13b are formed so that a distance d2 between a line L2a and a line L2b is larger than a diameter D of the rotating shaft 2 and is substantially equal to the inner diameter of the journal part 13a. In this case, the line L2a extends along an inclined surface of one second enlarged diameter part 13c toward the center of the bearing body 11, and the line L2b which extends along an inclined surface of the other second enlarged diameter part 13c positioned at an opposing corner with respect to the one second enlarged diameter parts 13c toward the center of the bearing body 11.

Figure 9:
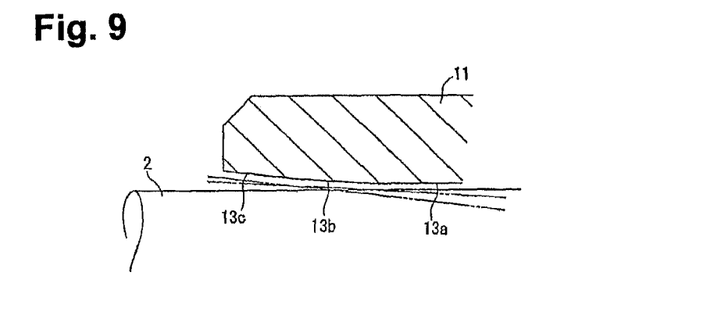
FIG. 9 is an enlarged view of principal parts showing a state in which the oil-impregnated sintered bearing comes into contact with the rotating shaft.

In the bearing, when the magnitude of torque transmitted to the rotating shaft 2 is different, the amount of deflection varies in proportion to the magnitude of torque and the oblique angle of the rotating shaft 2 is also varied in the bearing. When a relatively small torque is transmitted to rotate the rotating shaft 2, as shown in FIG. 9, the surface of the rotating shaft 2 comes into contact with the first enlarged diameter parts 13b having small taper angles and function as a bearing is exhibited as described above. Furthermore, when a large torque is exerted to rotate the rotating shaft 2, as shown in FIG. 9, the surface of the rotating shaft 2 comes into contact with the second enlarged diameter parts 13c having large taper angles and exhibits functions as a bearing.

In this way, even when the oblique angle of the rotating shaft 2 is also varied in the bearing, the surface of the rotating shaft 2 comes into contact with any one of the first enlarged diameter parts 13b and the second enlarged diameter parts 13c to obtain the same action as that of the conventional oil-impregnated bearing. Therefore, the function serving as a bearing does not deteriorate and deterioration of durability does not occur.

In addition, in the present embodiment, the first and second enlarged diameter parts 13b and 13c of which taper angles are varied in two steps are provided in the bearing body 1 as enlarged diameter parts. However, if the magnitude of torque transmitted to the rotating shaft 2 varies in multiple steps, the enlarged diameter parts may be formed in multiple steps so that the oblique angle of the rotating shaft 2 corresponds to the magnitude of torque in every step.

In the bearing according to the present embodiment, the following usage is also considered. Even though the magnitude of torque transmitted to the rotating shaft 2 is constant in a case where the rotating shaft 2 is supported at plural points by the bearings, the oblique angles of the rotating shaft 2 are mutually different at the plural points as long as distances between the bearings and a mechanism (for example, the spiral gear 6 described in the first embodiment) for transmitting torque to the rotating shaft 2 are mutually different. In this case, although bearings having an enlarged diameter part matched with each of the oblique angles may be used separately, a plurality of bearings having different shapes should be prepared which increases cost. Accordingly, if a bearing having the enlarged diameter parts, which are formed in multiple steps so as to match each of the oblique angles, and is manufactured by employing the bearing according to the present invention, only one kind of bearing is used for supporting the rotating shaft 2 at plural points. For this reason, it is possible to reduce cost by standardizing parts.

Figure 10:
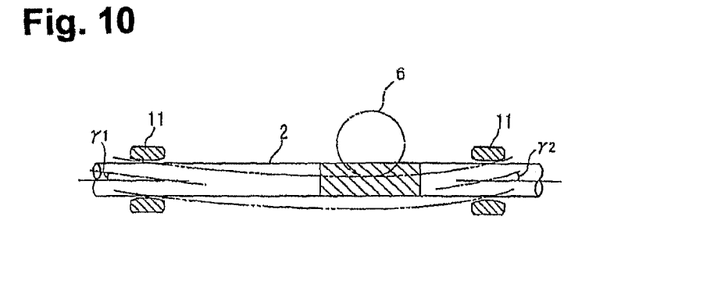
FIG. 10 is a view showing the entire outline of a mechanism in which a rotating shaft is supported at two points by the oil-impregnated sintered bearings of FIG. 8.

For example, as shown in FIG. 10, an oblique angle γ1 of the rotating shaft 2 in a bearing that is positioned relatively away from a torque transfer mechanism contacting rotating shaft 2, and an oblique angle γ2 of the rotating shaft 2 in a bearing that is positioned relatively close to the torque transfer mechanism are different from each other. When the both oblique angles are compared with each other, the oblique angle γ2 of the rotating shaft 2 in a bearing that is positioned relatively close to the torque transfer mechanism is larger than the oblique angle γ1. Accordingly, if a bearing is manufactured so that the taper angles $\theta_1$ of the first enlarged diameter parts 13b according to the present embodiment is set to match γ1 and the taper angles $\theta_2$ of the second enlarged diameter parts 13c is set to match γ2 and then is provided at each of the supporting points of the rotating shaft 2, it is possible to reasonably and smoothly support the rotating shaft 2 at any of the supporting points with one type of bearing, that is, bearings of the same shape.

Figure 11:
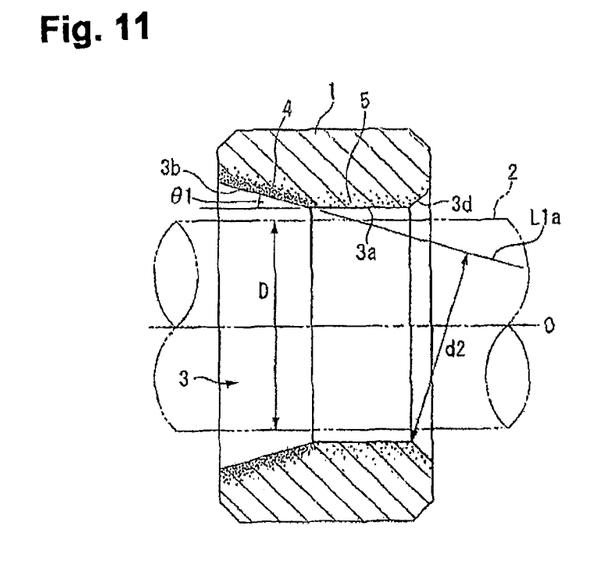
FIG. 11 is a cross-sectional view taken along an axis of a rotating shaft showing an oil-impregnated sintered bearing according to a third embodiment of the invention.

Next, a third embodiment of the oil-impregnated sintered bearing according to the invention will be described with reference to FIG. 11. The same reference numerals as those of the first embodiment are given to components already described in the first embodiment, and the descriptions thereof are omitted. In the bearing according to the present embodiment, an enlarged diameter part 3b is provided on only one side of the journal part 3a, and a chamfered portion 3d is provided on the other side of the journal part 3a. Since the chamfered portion 3d is generally provided in the bearing hole 3 in order to easily insert the rotating shaft 2 into the bearing hole 3, the chamfered portion 3d does not come into contact with the rotating shaft 2 even though the rotating shaft 2 is displaced in any manner.

In addition, when the bearing body 1 is seen from a cross section taken along the axis O of the rotating shaft 2 (see FIG. 11), the journal part 3a and the enlarged diameter part 3b are formed so that a distance d2 (corresponding the length of a normal line drawn from the line L1a in a terminating portion of the journal part remotest from the enlarged diameter portion 3b) between the line L1a and an inner wall surface of the journal part 3a is slightly larger than a diameter D of the rotating shaft 2 and is substantially equal to the inner diameter of the journal part 13a. In this case, the line L1a obliquely extends along an inclined surface of the enlarged diameter part 3b toward the center of the bearing body 1 and the inner wall surface of the journal part 3a faces the inclined surface of the enlarged diameter part 3b across the middle of the bearing body 1. Also, in the present embodiment, an angle (taper angle) $\theta_1$ formed between an inclined plane of the enlarged diameter part 3b and an inner surface (or axis O of the rotating shaft 2) of the journal part 3a parallel to the axial direction of the bearing body 1 is set to 3° or less.

In the bearing having the above-mentioned structure, when a shear load applied to the rotating shaft 2 is remarkably large and a push-back action caused by lubricating oil remaining between the rotating shaft 2 and the enlarged diameter part 3b does not sufficiently function, the rotating shaft 2 is supported while the axis of the rotating shaft 2 is inclined in the bearing body 1. However, since the surface of the rotating shaft 2 comes into contact with the enlarged diameter part 3b not by a point but by a line, stress concentration does not occur at the contact portion between the rotating shaft 2 and the bearing body 1. Therefore, excessive abrasion and overheating does not occur between the rotating shaft 2 and the bearing body 1.

Processes of manufacturing the above-mentioned bearing will be described with reference to FIG. 12. In the meantime, since processes from mixing raw powder to sintering and sizing process of forming the bearing hole 3 having the journal part 3a are equal to those of the first embodiment, descriptions thereof are omitted.

Figures 12A, 12B, 12C:
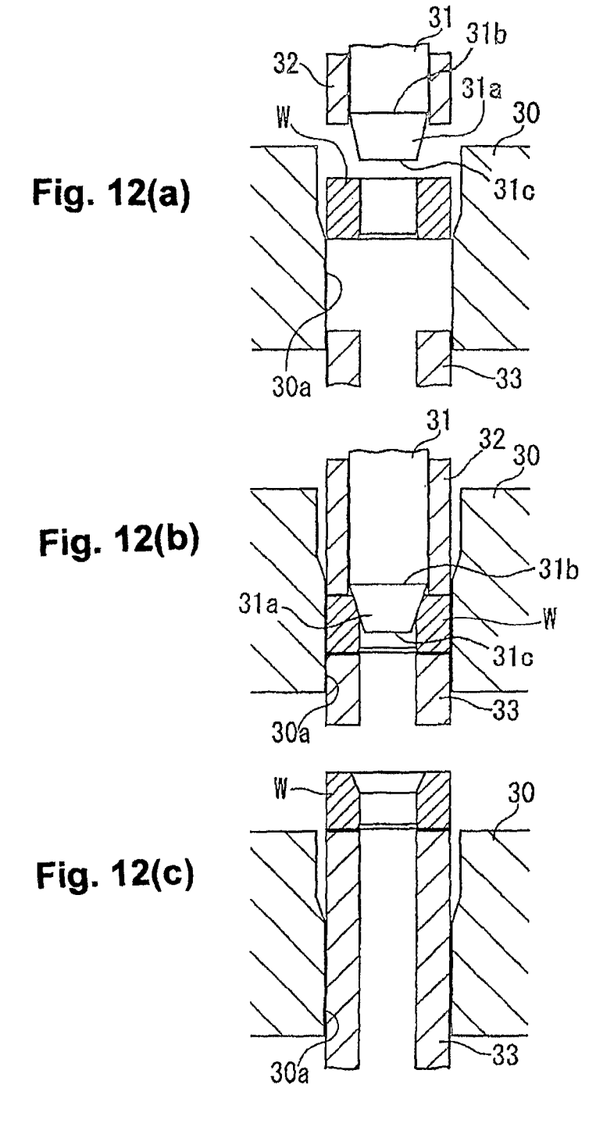
FIGS. 12A-12C are views sequentially illustrating a sizing process of the manufacturing processes of the oil-impregnated sintered bearing of FIG. 11.

As shown in FIGS. 12A to 12C, a die 30 including a hole 30a that has an inner diameter substantially equal to an outer diameter of a sintered body W, a fourth core rod 31 that has a round bar shape and can be inserted into the hole 30a from above with clearances, a third upper punch 32 that can be fitted into the hole 30a from above and has a simple annular tip surface, and a third lower punch 33 that can be fitted into the hole 30a from below and has a simple annular tip surface are used in the process of forming the enlarged diameter part 3b on one side of the journal part 3a.

An outer diameter of the fourth core rod 31 is larger than the inner diameter of the sintered body W, and a tip 31b the fourth core rod 31 is a truncated-cone shaped press die. The diameter of a base 31b thereof is larger than the inner diameter of the sintered body W, and an outer diameter of the tip surface 31c is smaller than the inner diameter of the sintered body W. Accordingly, the fourth core rod 31 can be inserted into or extracted from the third upper punch 32.

The die 30 is fixed in place, and the fourth core rod 31, the third upper punch 32, and the third lower punch 33 are driven by driving devices (not shown).

First, as shown FIG. 12A, the third lower punch 33 is fitted into the hole 30a of the die 30. Moreover, the third upper punch 32 having the fourth core rod 41 inserted therein is stood by above the die 30. Then, the sintered body W in which a bearing hole 3 including a journal part 3a and the chamfered portion 3d are completely formed is put into the hole 30a from above the die 30.

Next, as shown FIG. 12B, the third upper punch 32 is fitted into the hole 30a in synchronization with the fourth core rod 31 to push down the sintered body W. The pushed-down sintered body W is interposed between the third core rod 31 and the third lower punch 33 so as to be pressed by the third core rod 31 and the third lower punch 33.

The tip 31a of the fourth core rod 31 comes into contact with one opening which is formed one end of the bearing hole 3 formed by the previously performed sizing process, and then are inserted into the bearing hole 3 so as to be guided in the longitudinal direction of the bearing hole 3. The sintered body W is corrected by pushing truncated-cone shaped surfaces of the tip 31a of the fourth core rod 31 into the bearing hole 3 (the enlarged diameter part 3b is formed on one side of the journal part 3a). In this case, since a portion corresponding to the enlarged diameter part 3b is re-pressed by the truncated-cone surface of the tip 31a, sintering density of the portion corresponding to the enlarged diameter part 3b becomes high and the difference in density occurs between the journal part 3a and the above-mentioned portion.

When the correction is completed, the third upper punch 32 and the fourth core rod 31 are extracted from the hole 30a, subsequently, as shown in FIG. 12C, the third lower punch 33 is pushed up and then the corrected sintered body W is ejected from the hole 30a.

As mentioned above, in the sizing process, the bearing hole 3 that includes a journal part 3a and has a constant diameter is formed first, and then the enlarged diameter part 3b is formed on the basis of the bearing hole 3. Therefore, a position of the enlarged diameter part 3b is accurately adjusted with respect to the journal part 3a and the angle (taper angle) $\theta_1$ between the inner surface of the journal part 3a and the inclined plane of the enlarged diameter part 3b is formed very accurately.

On the other hand, every bearing according to the first to the third embodiment has a structure that prevents deviation from the center of the rotating shaft by providing difference in density in respective parts of the bearing body 1. However, the invention is not applied to only an oil-impregnated sintered bearing that has the above-mentioned structure, and can also be applied to an oil-impregnated sintered bearing of which bearing body has constant sintering density.

INDUSTRIAL APPLICABILITY

According to the invention, even when a rotating shaft is deflected due to a large shear load and the rotating shaft is rotated while an axis thereof is inclined in a bearing body, a surface of the rotating shaft comes into contact with tapered enlarged diameter parts by a line. For this reason, stress concentration does not occur at the contact portion and excessive abrasion and overheating does not occur between the rotating shaft and the bearing body. Therefore, the bearing and the rotating shaft are damaged, not themselves, thereby obtaining a high durability.

In addition, even when the magnitude of torque transmitted to the rotating shaft is different and an oblique angle of the rotating shaft varies in the bearing, the surface of the rotating shaft constantly comes into contact with the enlarged diameter parts having the taper angles to obtain the same action as that of the conventional oil-impregnated bearing as long as the enlarged diameter parts are formed in multiple steps so as to have taper angles matching the oblique angle. Therefore, the above-mentioned effects are obtained.

Furthermore, according to a method of manufacturing the bearing of the invention, a bearing hole that includes a journal part and has a constant diameter is formed first, and then the enlarged diameter parts are formed on the basis of the bearing hole. For this reason, positions of the enlarged diameter parts are accurately adjusted with respect to the journal part included in bearing hole. Therefore, it is possible to accurately form angles between an inner surface of the journal part and inclined planes of the enlarged diameter parts, and as a result, exhibits center deviation-suppressing action of the oil-impregnated sintered bearing satisfactorily.

The invention claimed is:
1. A method of manufacturing an oil-impregnated sintered bearing which includes a bearing body that is made of a sintered metal and has a bearing hole formed therein for supporting a rotating shaft by an inner surface thereof as a friction surface, wherein the bearing hole includes: a journal part that has a constant diameter; and at least one enlarged diameter part that is provided so as to be connected with the journal part, wherein the journal part is configured to support the rotating shaft when the shaft is parallel to an axial direction of the bearing body, wherein the at least one enlarged diameter part is configured to support the rotating shaft when the shaft inclines with respect to the axial direction of the bearing body, the method comprising the steps of:

pressing an inner circumferential surface of a cylindrical sintered body to form the bearing hole; and re-pressing the inner circumferential surface of the cylindrical sintered body to form the at least one enlarged diameter part, wherein substantially cone-shaped press dies, each having a diameter larger than the inner diameter of the sintered body, are used for forming the enlarged diameter part, wherein the press dies are simultaneously inserted from both sides of the sintered body, respectively, and the tips of the press dies are pushed against the inner circumferential surface of the sintered body without coming into contact with each other, wherein during the re-pressing step, a sintered density of the enlarged diameter part is made larger than that of the journal part such that cavities exposed on an inner surface of the enlarged diameter part are smaller in size and fewer in number than those of cavities exposed on an inner surface of the journal part, and wherein during the re-pressing step, when the at least one enlarged diameter part that is directly connected with an end of the journal part is called a first part, a line obliquely extending along an inclined surface of one of the first parts is arranged parallel to a line obliquely extending along an inclined surface of the other first part, and a distance between the lines is substantially equal to the diameter of the rotating shaft.

2. The method of manufacturing an oil-impregnated sintered bearing according to claim 1, further comprising the step of:

providing the at least one enlarged diameter part on each end of the journal part in the axial direction of the bearing body such that the at least one enlarged diameter part on each end of the journal part is connected by the journal part at a boundary between the journal part and the enlarged diameter part, and wherein the sintered density changes at the boundary so that the enlarged diameter part has a substantially higher density than the journal part.

* * * * *